United States Patent
Fournier

(10) Patent No.: US 7,350,270 B2
(45) Date of Patent: Apr. 1, 2008

(54) GUIDE WHEEL HAVING INTEGRATED BEARING MOUNT

(75) Inventor: Stephen Fournier, Pittsburg, CA (US)

(73) Assignee: Bishop-Wisecarver Corporation, Pittsburg, CA (US)

( * ) Notice: Subject to any disclaimer, the term of this patent is extended or adjusted under 35 U.S.C. 154(b) by 103 days.

(21) Appl. No.: 11/207,242

(22) Filed: Aug. 18, 2005

(65) Prior Publication Data

US 2006/0140519 A1      Jun. 29, 2006

Related U.S. Application Data

(60) Provisional application No. 60/639,076, filed on Dec. 23, 2004.

(51) Int. Cl.
    *A47H 15/00* (2006.01)
(52) U.S. Cl. .......................................... 16/91
(58) Field of Classification Search ............... 16/91, 16/97, 106, 107, 45–47, 25, 36; 301/1, 111.01, 301/111.06, 5.1, 5.23, 5.309, 5.7, 105.1; 384/58.59, 384/18, 19, 542, 449
See application file for complete search history.

(56) References Cited

U.S. PATENT DOCUMENTS

| | | | |
|---|---|---|---|
| 1,375,536 A * | 4/1921 | Ostrander ....................... 16/19 |
| 2,082,798 A * | 6/1937 | Herold ......................... 301/136 |
| 3,446,537 A | 5/1969 | Sutowski |
| 3,469,892 A * | 9/1969 | Langstroth .................... 384/18 |
| 3,588,206 A | 6/1971 | Frost |
| 3,661,431 A | 5/1972 | Wisecarver |
| 4,109,343 A * | 8/1978 | Weis et al. ..................... 16/98 |
| 4,815,863 A | 3/1989 | Forster |
| 4,958,943 A * | 9/1990 | Nakanishi ..................... 384/488 |
| 5,054,342 A | 10/1991 | Swiatowy et al. |
| 5,302,030 A | 4/1994 | Buie et al. |
| 5,368,399 A | 11/1994 | Tremblay |
| 5,470,159 A | 11/1995 | Hillmann |

FOREIGN PATENT DOCUMENTS

| DE | 4216900 A * | 11/1992 |
|---|---|---|
| EP | 274682 A * | 7/1988 |

\* cited by examiner

*Primary Examiner*—Chuck Y. Mah
(74) *Attorney, Agent, or Firm*—Michael A. Glenn; Glenn Patent Group

(57) ABSTRACT

A guide wheel assembly includes a journal body having an inner bearing race, an axial mounting face, a longitudinally extending threaded mounting portion, a hexagonal tool engaging surface located between the axial mounting face and the inner bearing race, and a guide wheel rotatably supported by the journal body for rotation about the inner bearing race.

20 Claims, 7 Drawing Sheets

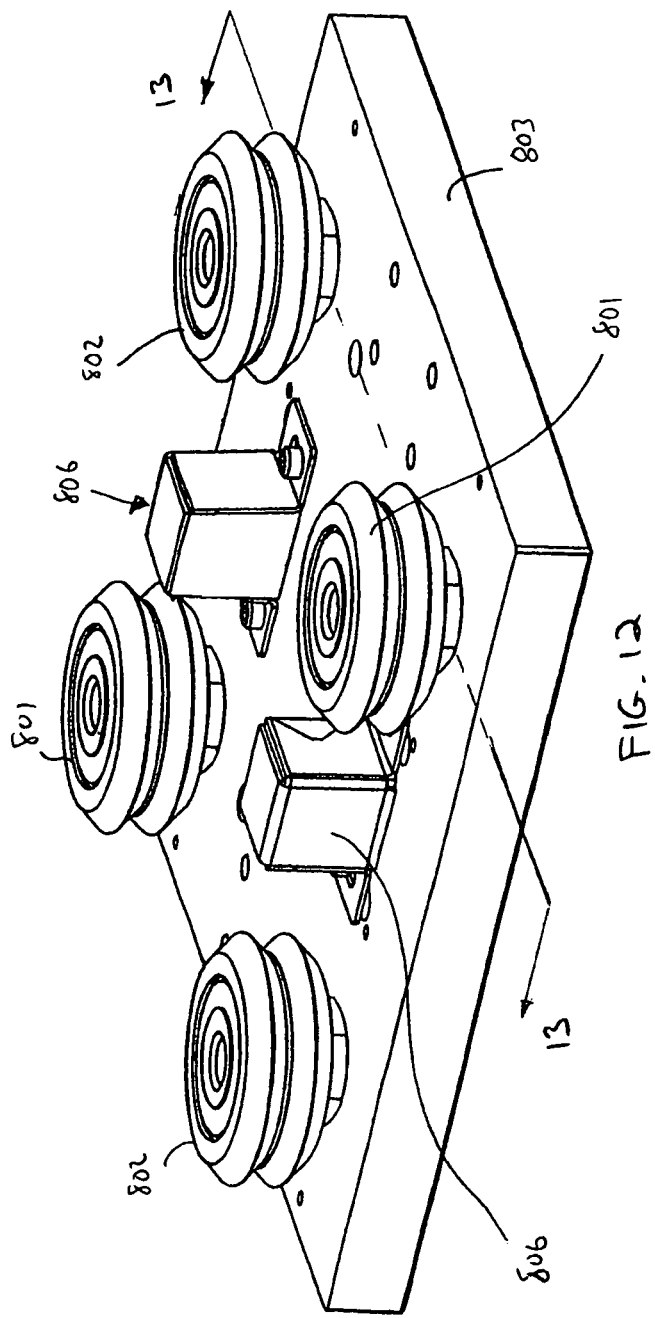
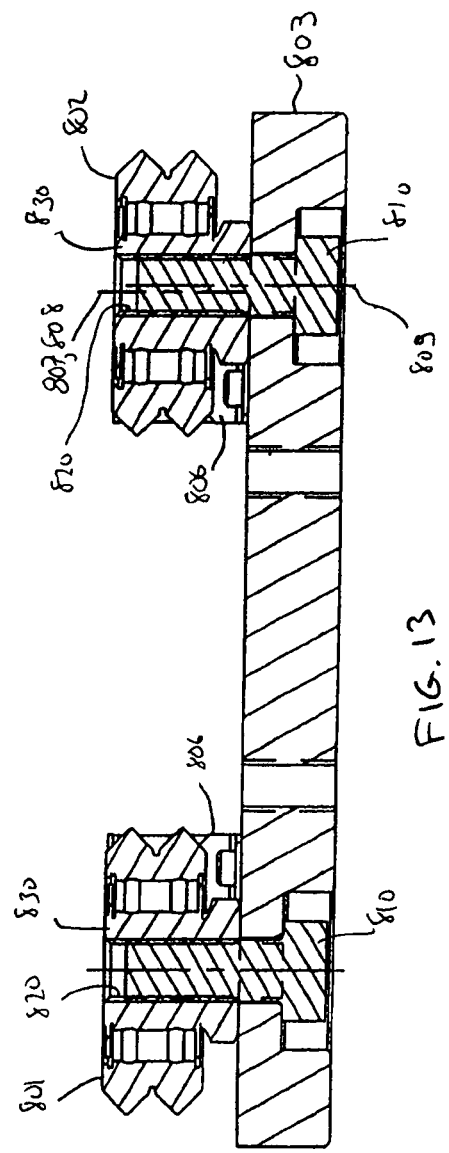
FIG. 12
FIG. 13

GUIDE WHEEL HAVING INTEGRATED BEARING MOUNT

CROSS REFERENCE TO RELATED APPLICATIONS

This application claims priority to now abandoned provisional application No. 60/639,076, filed Dec. 23, 2004, entitled GUIDE WHEEL HAVING INTEGRATED BEARING MOUNT, which application is incorporated herein in its entirety by this reference.

FIELD OF THE INVENTION

This invention relates, in general, to guided motion technology, and more particularly to low friction guide wheels, and to methods for their use.

BACKGROUND OF THE INVENTION

In manufacturing processes and within manufactured capital goods themselves, precise and repeatable motion is useful and often essential. For example, in manufacturing processes ranging from machining to textiles to electronics, tool heads or other items move back and forth and must do so precisely and repeatedly over enormous numbers of cycles. In another example, specimens and instrumentation move relative to each other within laboratory analytic devices to collect data on the samples and must do so precisely and repeatedly.

Guide wheels attached to support bases and riding on rails is one class of guided motion technology providing precise and repeatable kinematics. For example, U.S. Pat. No. 3,661,431 discloses guide wheels and tracks in which guide wheels 1 cooperate with rails 14 such that the guide wheels may move along the rails.

While guide wheel and rail systems are highly precise and reliable conveyances, industry trends require guide wheels that are increasingly compact and low profile, as well as increasingly able to carry larger weights over longer lifetimes. With respect to lifetime and reliability, the economic costs to a manufacturing operation of replacement time or failure can be substantial. For example, on the order of millions of dollars per day of down time in semiconductor wafer manufacturing. In capital goods as well, the cost of replacement time or failure may also be substantial because replacement of guide wheels may collaterally necessitate realignment or recalibration of other components. This is especially the case in optical systems.

One solution to the technical demands of increased lifetime and weight carrying capacity is to simply increase the scale of guide wheels. Proportionally scaling up a guide wheel assembly can increase the load capacity. As well, a larger wheel assembly will have a longer lifetime for a given load because the load-bearing portions operate farther from their maximal capacity and rotating parts rotate less frequently to travel a given distance.

Scaling is, however, not a solution under many circumstances because of a need to maintain wheel size. Often tight spacing or additional replacement costs that would be necessitated by increasing wheel size make scaling the wheels impossible or impractical or uneconomical.

What is needed, therefore, are guide wheel assemblies with increased lifetime and load-carrying capability as compared to present devices, which increases being realized without scaling the wheel size.

BRIEF SUMMARY OF THE INVENTION

In summary, one aspect of the present invention is directed to a guide wheel assembly, including a journal body having an inner bearing race, an axial mounting face, a longitudinally extending threaded mounting portion, and a hexagonal tool engaging surface located between the axial mounting face and the inner bearing race, and a guide wheel rotatably supported by the journal body for rotation about the inner bearing race.

In one embodiment, the threaded mounting portion may be eccentrically disposed on the journal body. The threaded mounting portion may be a through-bore extending longitudinally through the journal body wherein the journal body serves as a bushing. The threaded mounting portion may be a longitudinally extending stud having a threaded end. The threaded mounting portion may include a collar shoulder disposed between the threaded end and the a hexagonal tool engaging portion, the collar shoulder including the axial mounting face and an outer mounting diameter wherein the axial mounting face and the outer mounting diameter are dimensioned and configured to cooperate with a counter bore of a mounting plate. The monolithic journal may be made of hardened steel.

Another aspect of the present invention is directed to a guide wheel assembly, including a wheel having a wheel bore therethrough, the wheel bore centered on a wheel axis, wherein a wheel bore surface may be formed and dimensioned to be an outer bearing race of the guide wheel assembly, a monolithic journal body having a first portion formed and dimensioned to be an inner bearing race of the guide wheel assembly, the first portion symmetrically disposed about a longitudinal bearing axis of the journal body, and a threaded portion disposed about a longitudinal axis of support, the longitudinal axis of support being distinct from the longitudinal bearing axis of the journal body, and at least one bearing located between the inner and outer bearing races such that the longitudinal bearing axis of the journal body coincides with the wheel axis, thereby enabling rotation of the wheel relative to the journal body about the coinciding axes.

In one embodiment, the threaded portion of the monolithic journal body may be female. Alternatively, the threaded portion of the monolithic journal body may be male. Alternatively, the threaded portion of the monolithic journal body is male, and the journal body may include a collar shoulder located between the threaded portion and the bearing race portion of the journal body, the collar shoulder circumferentially extending about the axis of support at a distance greater than the threaded portion, for cooperating with a counter bore of a mounting structure to effect alignment of the axis of support and the mounting structure as location the bearing axis relative to the mounting structure is adjusted.

The wheel bore surface and the first portion of the monolithic journal body may include furrows for cooperating with the at least one bearing to restrain translation of the journal body relative to the wheel along the bearing axis. The journal body may include a mounting face and a tool-engaging surface located between the mounting face and the first, inner bearing race portion of the journal body. The monolithic journal body may be steel.

A further aspect of the present invention is directed to a guide wheel assembly, including a monolithic wheel having a wheel bore therethrough, the wheel bore centered on a wheel axis, wherein a wheel bore surface may include furrows, the furrows formed and dimensioned to be an outer bearing race of the guide wheel assembly, a monolithic journal body having a first portion formed and dimensioned to be an inner bearing race of the guide wheel assembly, the first portion including furrows and symmetrically disposed about a longitudinal bearing axis of the journal body, and a second, threaded portion disposed about a longitudinal axis of support, and a plurality of bearings located between the inner and outer bearing races such that the longitudinal bearing axis of the journal body coincides with the wheel axis, the bearings confined by the furrows, thereby enabling rotation of the wheel relative to the journal body about the coinciding axes and restraining translation of the journal body relative to the wheel along the coinciding axes.

Again, in one embodiment, the threaded portion of the monolithic journal body may be female or male. The longitudinal axis of support may be distinct from the longitudinal bearing axis of the journal body. In one embodiment, the threaded portion of the monolithic journal body is male, and the journal body may include a collar shoulder located between the threaded portion and the bearing race portion of the journal body, the collar shoulder circumferentially extending about the axis of support at a distance greater than the threaded portion, for cooperating with a counter bore of a mounting structure to effect alignment of the axis of support and the mounting structure as location the bearing axis relative to the mounting structure is adjusted. The journal body may include a mounting face and a tool-engaging surface located between the mounting face and the first, inner bearing race portion of the journal body. The monolithic journal body may include two tool engaging surfaces located on opposing sides of the first, inner bearing race portion of the journal body, the tool engaging surfaces symmetrically disposed about the longitudinal bearing axis of the journal body and the longitudinal axis of support, respectively.

The guide wheels of the present invention have other features and advantages which will be apparent from or are set forth in more detail in the accompanying drawings, which are incorporated in and form a part of this specification, and the following Detailed Description of the Invention, which together serve to explain the principles of the present invention.

BRIEF DESCRIPTION OF THE DRAWINGS

FIG. 12 is a perspective view of another guide wheel and mounting plate assembly utilizing a pair of guide wheels of FIG. 7 and a pair of guide wheels of FIG. 9.

FIG. 13 is a cut-away view of the guide wheel and mounting plate assembly of FIG. 12 taken substantially along line 13-13 of FIG. 12.

DETAILED DESCRIPTION OF THE INVENTION

Reference will now be made in detail to preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

As described above, scaling a guide wheel assembly is often an impractical solution to the problem of increasing weight-carrying capacity and service life. According to a principle of the invention, by contrast, the problem is solved and the advantages reaped by providing a monolithic journal while maintaining wheel size.

The structure of a monolithic journal enables realization of increased weight-carrying capacity and service life through two fundamental quantities. One quantity, a moment of inertia, depends on physical size. A monolithic journal enables a journal diameter to be comparatively larger, given the same size wheel. Another quantity, Young's modulus, relates to material strength. A monolithic journal enables higher modulus (stronger, harder) materials to be used for the journal body. In contrast, because many prior art journals must be swaged or otherwise plastically deformed to fit with other supporting parts, utilizing high strength or hard materials for journal bodies has not been a common practice in the guided motion industry to date.

Importantly, size and material changes with respect to the journal can act non-linearly to produce the advantageous effects, above. For example, experience in the guided motion field shows that, to a well-known practical approximation, guide wheel service life is proportional to the inverse cube of a combined axial and radial fractional loading:

$$\text{Life} = \text{constant}/(L_f)^3;$$

where, with "L" denoting load, $$L_f = (L_{Axial}/L_{Axial,\ max.}) + (L_{Radial}/L_{Radial,\ max.}).$$

In a numerical example according to the equations above, increasing the maximal axial and radial load carrying capacity by 10% yields a 33% increase in service life.

According to a principal of the invention, providing a monolithic journal allows increases in the journal body moment of inertia and Young's modulus, each of which in turn can increase the maximal axial and radial loads, above. The term "journal" herein also includes a journal acting as a bushing.

Figure 1:
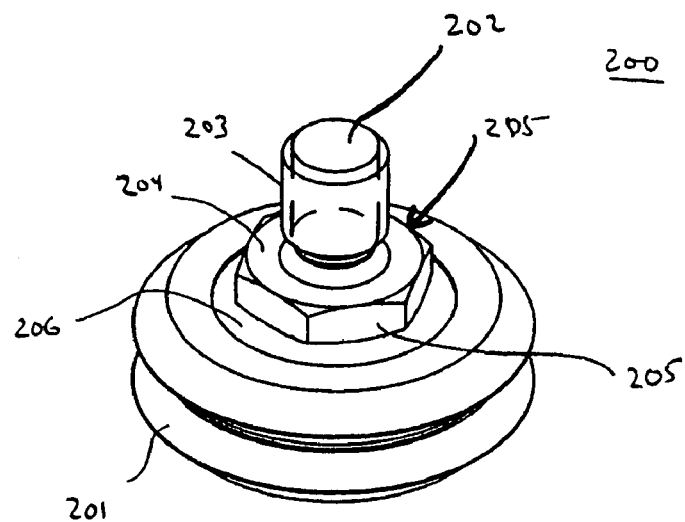
FIG. 1 is a perspective view of a guide wheel assembly having an integral bearing race and a male threaded portion and coincidental bearing and support axes in accordance with the present invention.
Figure 2:
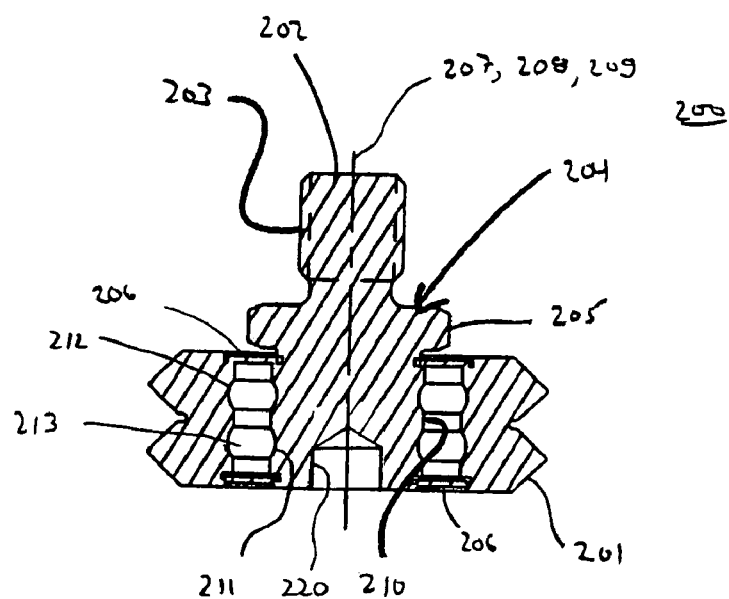
FIG. 2 is a cut-away views of the guide wheel assembly of FIG. 1 showing a cross-section of the bearing race and the male threaded portion.

Turning now to the drawings, FIG. 1 and FIG. 2 show, respectively, perspective and cut-away views of an embodiment of a guide wheel assembly according to the invention. Note that FIG. 1 and FIG. 2, as well as all of the figures, are schematic in nature in that details have been omitted for the sake of clarity.

FIG. 1 shows guide wheel assembly 200, which includes wheel 201 and journal body 202. In this and the following figures, the journal body is rotatably supported within the wheel by bearings. While not apparent in FIG. 1, the internal structure of the wheel assembly that enables such rotation will be described in detail below.

The embodiment in FIG. 1 has guide wheel 201 with a W-shaped profile. Such a W-shaped profile is preferred, but not essential or necessary. Alternatives include, for example, a V-shaped profile. One will appreciate that many alternative shapes may be used in accordance with the present invention. Moreover, in this preferred embodiment, the guide wheel is a single piece monolith. Other embodiments, however, may include a wheel made of more than one piece.

In accord with a broad aspect of the invention, journal body 202 is a single piece that is monolithically formed. The journal body in this embodiment includes male threaded portion 203 at a distal end, or "stud." FIG. 1 schematically illustrates the threads for clarity, as do most of the figures. To attach or mount the guide wheel assembly to another body (shown in later figures), torque may be applied to the journal body by fitting a tool onto tool-engaging surface 205. One will appreciate that the other side of the wheel may be provided with a corresponding tool-engaging surface on the other side of the wheel in accordance with the present invention. Preferably tool-engaging surface 205 is hexagonal. Many alternatives are, however, apparent; such other polygonal surfaces or two opposing flat surfaces. When threaded onto a mounting plate or other structure with a receiving hole, mounting face 204 fits snugly against a region around the hole. Optional shields 206 are covers to protect the bearings from dirt and dust.

FIG. 2 is a cut-away side view of guide wheel assembly 200 shown in FIG. 1. The cutting plane is through the center of wheel 201. The wheel assembly includes the wheel, which has a bore centered on wheel axis of symmetry (and rotation) 207. Here, the wheel is a monolithic W-shaped wheel. A wheel bore surface is formed and dimensioned to be an outer bearing race and, in this embodiment, includes furrows 212.

Monolithic journal body 202 is disposed within the wheel bore and has two characteristic longitudinal axes. One axis is longitudinal bearing axis 208. First portion 210 of the journal body is symmetrically disposed about the longitudinal bearing axis and is formed and dimensioned to be an inner bearing race of the guide wheel assembly. The journal body has a second characteristic longitudinal axis. Longitudinal axis of support 209 is an axis around which threads on threaded portion 203 are disposed. Tool-engaging surfaces 220 and 205, located on opposing ends of the first, inner bearing race portion of the journal body, enable torque to be applied about the respective bearing and support axes. While tool-engaging surface 220 shown in FIG. 2 is located in a female portion of the journal body, other embodiments dispose the surface on a male portion extending away from wheel 201.

In the embodiment of FIG. 2, the three longitudinal axes, above, coincide and are not distinct. Typically, the wheel axis and the bearing axis do coincide. As described below, however, some embodiments have axis of support 209 that is distinct from bearing axis 208. That is, the axis of support and the bearing axis do not coincide.

Furrows 212 on the wheel bore surface cooperate with corresponding furrows 211 on first portion 210 of the journal body to secure the guide wheel assembly 200. Once bearings 213 are fit between furrows, monolithic journal body 202 is rotatably supported within the wheel bore by the bearings. The wheel and journal body may rotate relative to each other. The furrows and bearings cooperate, however, to constrain translation of the journal body relative to the wheel along the bearing axis 208. In this and other embodiments, the bearings are preferably ball bearings made of hard steel, or other suitable material. Otherwise common bearing seals and cages (not shown) are optional but preferred. Shields 206 are also optional but preferred in order to keep dust and dirt from the bearings. Embodiments including shields and/or seals typically have a journal body with shoulders for the shields and/or seals to rest against.

FIG. 2 illustrates an advantage of a journal formed in accord with the principles of this invention. From FIG. 2, one can readily appreciate that with such a monolithic journal body, the diameter of the journal body can approach the diameter of the inner bearing race of wheel 201, the approach limited principally by the practical minimal size of bearings 213. With a larger diameter journal body, including threaded portion 203, a moment of inertia of the journal body is increased, scaling as the square of the diameter. As well, the embodiment in FIG. 2 illustrates that no swaging or other process requiring flowing journal body material under stress is required to join with attachment pieces or hold the guide wheel assembly together. Thus, the monolithic journal may be formed from high modulus materials, which increases maximal strength, which in turn increases service life as described above. Preferred high modulus materials include, but are not limited to steel, stainless steel, hardened steel, ceramics, polymers, and other suitable materials.

Figure 4:
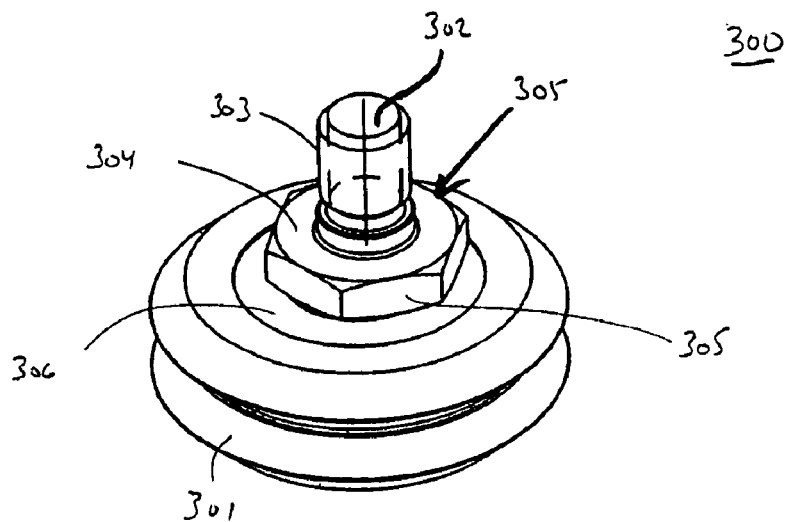
FIG. 4 is a perspective view of another guide wheel assembly having an integral bearing race and a male threaded portion and discrete bearing and support axes.
Figure 5:
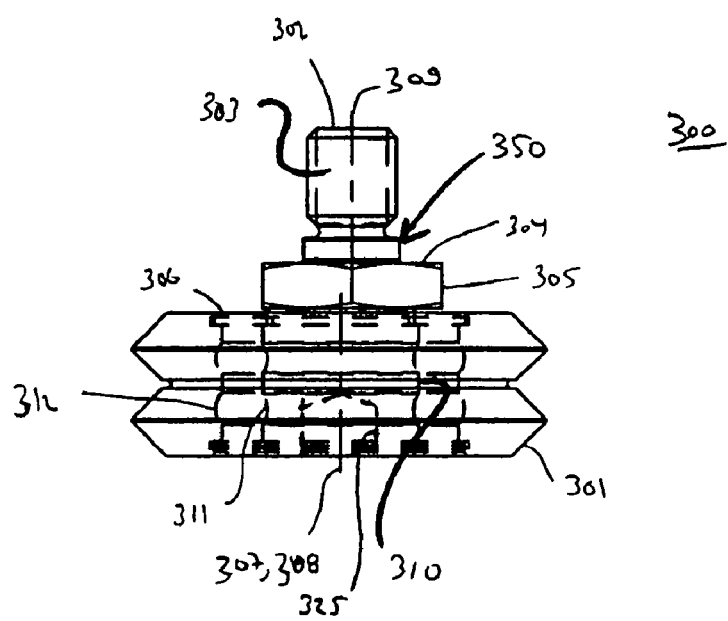
FIG. 5 a side elevational view of the guide wheel assembly of FIG. 4 showing the bearing race in phantom.

FIG. 4 and FIG. 5 are, respectively, perspective and side views of another of a guide wheel assembly having distinct bearing and support axes. This embodiment is similar to that shown in FIG. 1 and FIG. 2, and numerals after the first digit correspond with those in FIG. 1 and FIG. 2. Hidden lines schematically reveal the inside of the wheel assembly. See FIG. 2 for a cut away view of a similar embodiment.

FIG. 4 shows that, for this embodiment, longitudinal axis of support 309 of monolithic journal body 302 is distinct from the bearing and wheel longitudinal axes 307 and 308, respectively. Moreover, tool-engaging surface 305 and 325 disposed about axis of support 309 and bearing axis 308, respectively, enable torque to be applied about each of the distinct axes.

A wheel assembly with a distinct axis of support is advantageous in combination with other guide wheel assemblies such as those of FIG. 1 and FIG. 2. For example, with two guide wheel assemblies such as in FIG. 1 and FIG. 2, two rail contact points on the respective wheels define a line. To a close approximation, a guide rail will be straight and follow this line. The longer the rail, however, the more likely small deviations from perfect rail linearity will occur. To maintain close contact with the rail, a third wheel with a distinct axis of support is advantageous in that the guide wheel assembly may be rotated to take up the small deviation, which otherwise might cause flexure of the unit to which the guide wheel assemblies are mounted. An embodiment of such a system is illustrated and described in detail below.

Figure 6:
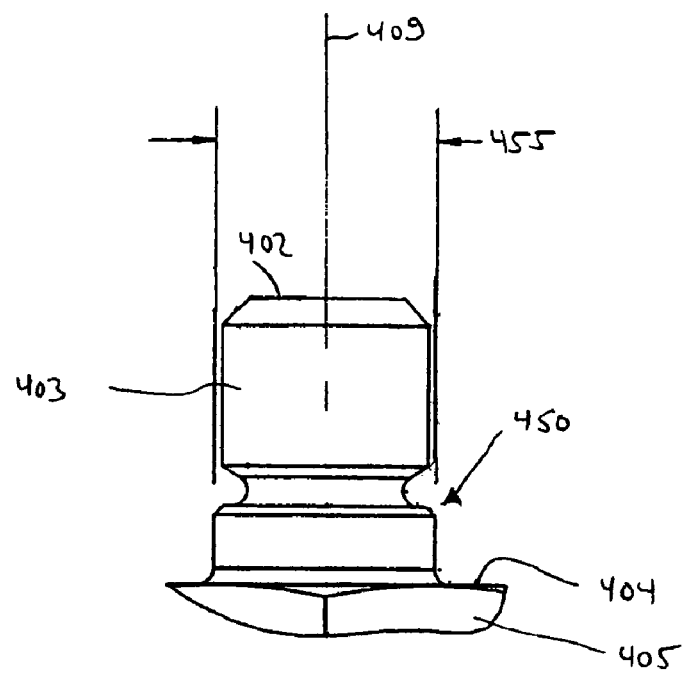
FIG. 6 is an enlarged side view of the guide wheel assembly of FIG. 4 illustrating the collar shoulder portion.
Figure 3:
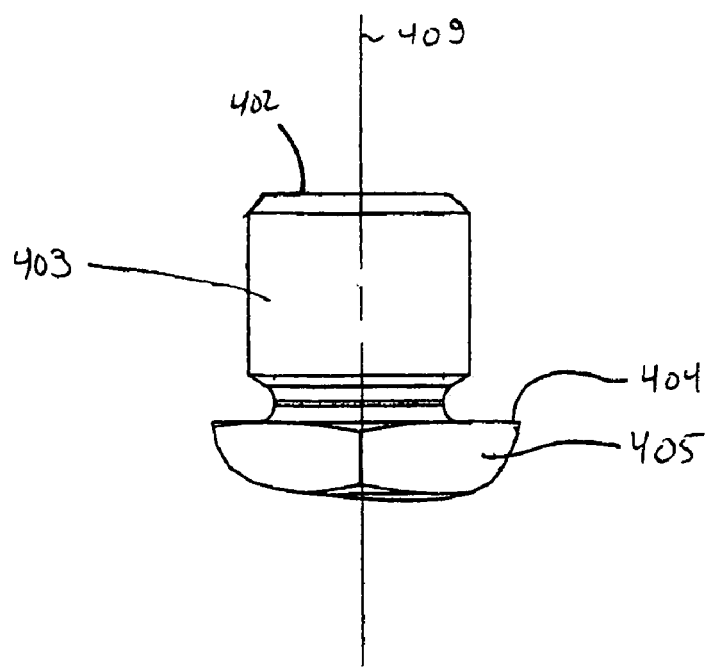
FIG. 3 is an enlarged side view of the guide wheel assembly of FIG. 1 illustrating the lack of a collar portion.

FIG. 3 and FIG. 6 are side views comparing, respectively, embodiments of a guide wheel assembly with and without a collar shoulder portion located near a male distal end of a journal body. Such a collar is advantageous in cooperation with a counter-bore on a mounting plate or other structure to align the support axis of the journal body with the counter-bore and rotate the guide wheel assembly about the distinct support axis as described above.

In FIG. 3 and FIG. 6, numerals after the first digit coincide with the numerals in FIG. 4 and FIG. 5. Collar shoulder portion 450 is disposed on monolithic journal body 402 between tool-engaging surface 405 and male, distal threaded portion 403. The distal threaded portion is symmetric about axis of support 409. As in the preceding figures, the threads are shown schematically for the sake of clarity.

Collar shoulder portion 450 includes mounting face 404, and extends circumferentially about the axis of support 409 at a distance greater than threaded portion 403. That is, a mounting diameter 455 of the collar shoulder is greater than a major diameter of the threads.

For comparison, FIG. 3 shows an embodiment without a collar shoulder portion.

A collar shoulder is particularly advantageous in embodiments where the support axis and bearing axis are distinct. Such embodiments are also referred to as "eccentric" because, when viewed along the axes, a distinct support axis does not pass through the geometrical center of the wheel, as do the bearing and wheel axes and instead are offset from the geometrical center of the wheel. Embodiments that are not eccentric typically do not have a collar shoulder, but are not precluded from having one.

Figure 11:
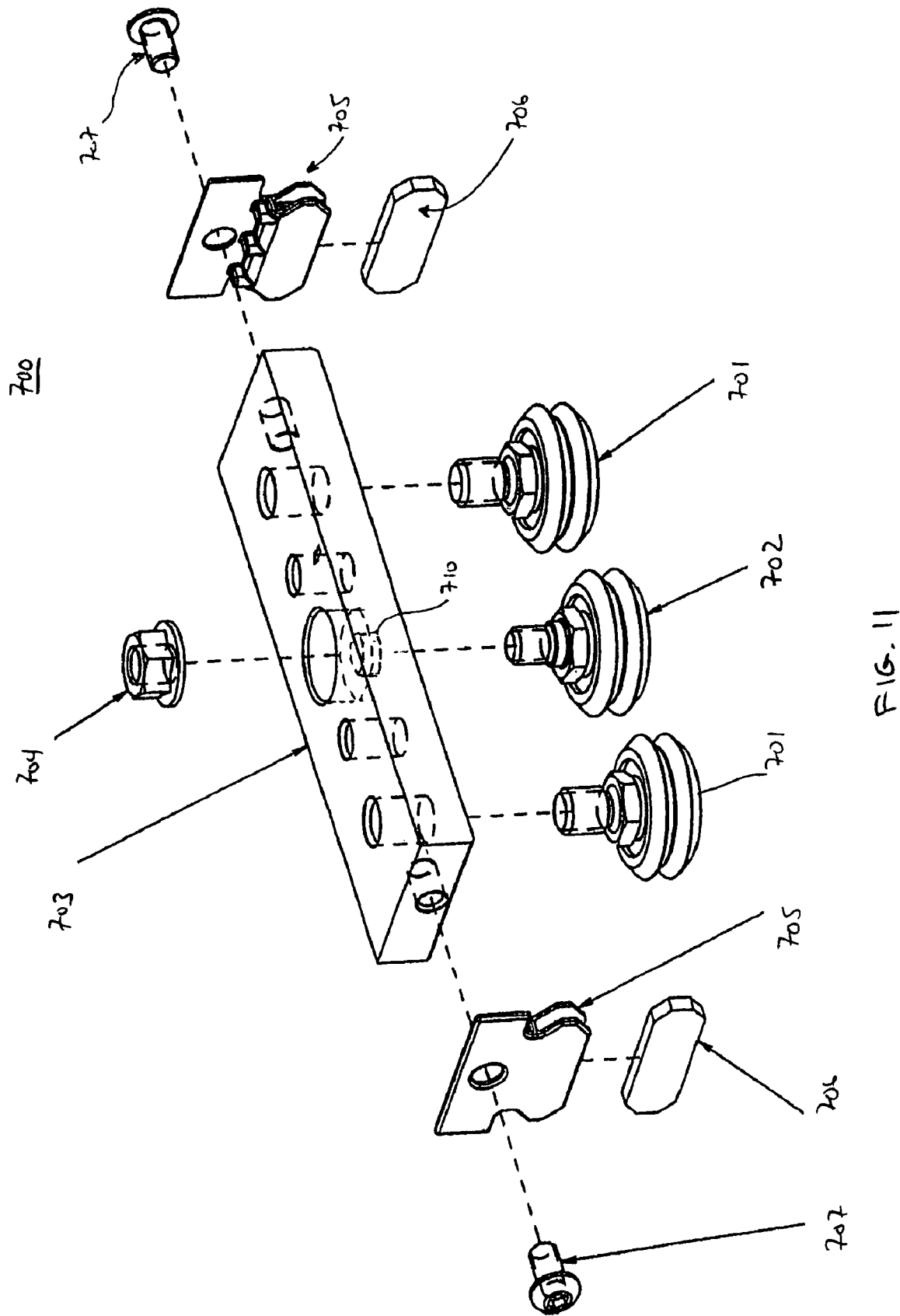
FIG. 11 is an exploded perspective view a guide wheel and mounting plate assembly utilizing a pair of guide wheels of FIG. 1 and a guide wheel of FIG. 4.

In typical use, collar shoulder 450 cooperates with a counter-bore of another piece to which the wheel assembly attaches. For example and as illustrated in FIG. 11, a threaded nut engages threaded portion 403 from above. Once the collar shoulder of the journal body 402 is in and constrained by the counter-bore, one may apply torque about axis of support 409 by engaging a tool at surface 405 and turning. By doing so, one moves the bearing axis relative to the mounting structure and by so doing may eliminate any small gap between the wheel and rail for the purposes described above. Once in a desired position, the nut may be tightened down from above to fix the desired position.

Figure 7:
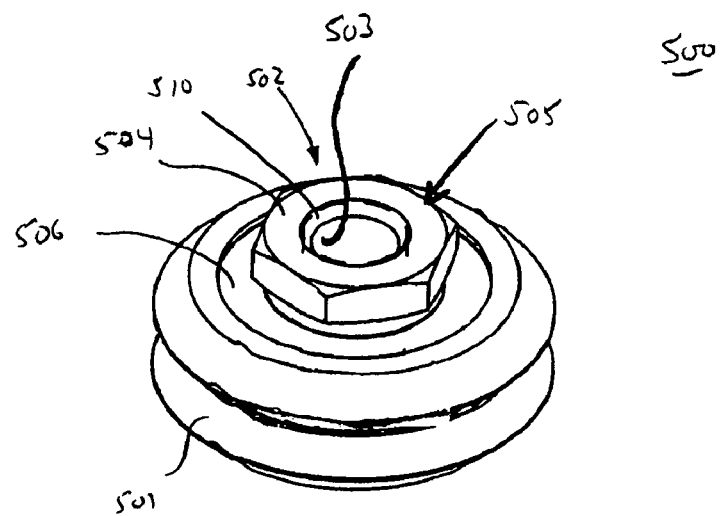
FIG. 7 is a perspective views of another guide wheel assembly having a integral bearing race and female threaded portion and coincidental bearing and support axes.
Figure 8:
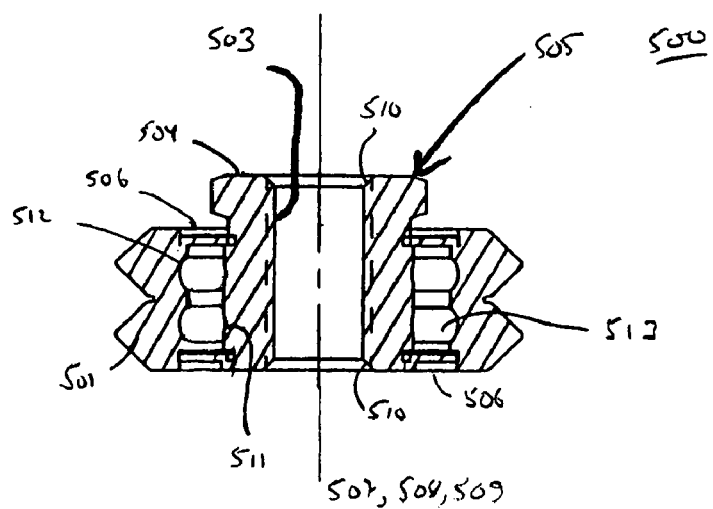
FIG. 8 is a cut-away views of the guide wheel assembly FIG. 7 showing a cross-section of the bearing race and female threaded portion.

FIG. 7 and FIG. 8 are, respectively, perspective and cut-away views of an embodiment of a guide wheel assembly having a monolithic journal body with a female threaded portion and coincidental bearing and support axes. Numerals following the first digit are as in earlier figures.

The embodiment in FIG. 7 and FIG. 8 corresponds to the embodiment in FIG. 1 and FIG. 2, except that threaded portion 503 of monolithic journal body 502 is female. Here, a mounting portion of the journal body is a through-bore through the journal body. In alternate embodiments, however, the female threaded portion need not extend completely through the journal body or alternatively may even be a completely smooth bore. As in the earlier figures, the threads are shown schematically in FIG. 8 for clarity. Wheel axis 507, longitudinal bearing axis 508, and support axis 509 are coincidental and not distinct in this embodiment. Chamfers 510 are preferred but not essential.

Figure 9:
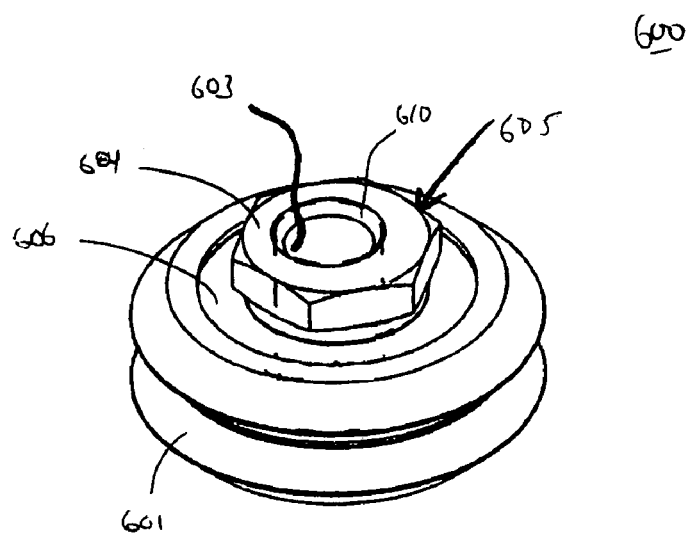
FIG. 9 is a perspective view of another guide wheel assembly having an integral bearing race and female threaded portion and distinct bearing and support
Figure 10:
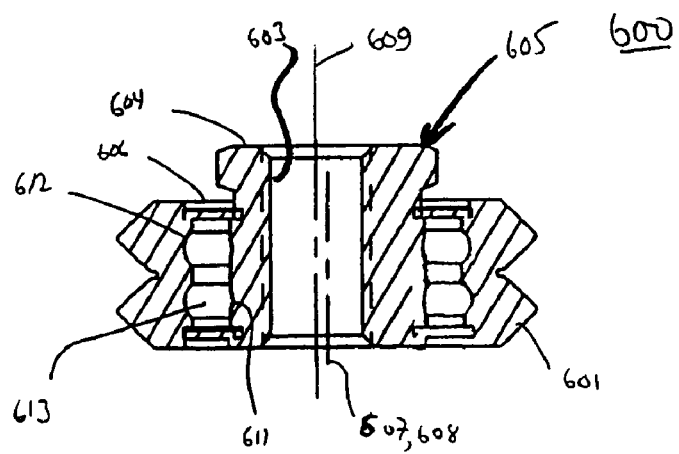
FIG. 10 is a cut-away views of the guide wheel assembly FIG. 9 showing a cross-section of the bearing race and female threaded portion

FIG. 9 and FIG. 10 are, respectively, perspective and cut-away views of an embodiment of a guide wheel assembly having a female threaded portion and distinct bearing and support axes. In FIG. 7 and FIG. 8, by comparison, bearing axis 508 and support axis 509 coincided and were not distinct. Numbering following the first digit is as in the preceding figures. In the embodiment of FIG. 9 and FIG. 10, tool-engaging surface 605 is centered on coincident wheel and bearing axes 607 and 608, respectively. However, alternative embodiments may center dispose the tool-engaging surface around the longitudinal axis of support 609 instead. Other alternate embodiments may include tool-engaging surfaces on the journal body opposite bearings 613.

FIG. 11 is an exploded perspective view of an embodiment of a single rail guide wheel and mounting plate assembly. Mounting plate 703 is drilled and tapped with threads to receive guide wheel assemblies 701 and 702. Further, fasteners 707 and brackets 705 attach rail lubricators 706 to the mounting plate. For the sake of clarity, a rail is not shown, nor is additional equipment that may attach to the mounting plate.

The embodiment in FIG. 11 includes three guide wheel assemblies. Two assemblies, 701, are similar to the embodiments shown in FIG. 1 and FIG. 2. That is, the monolithic journal bodies have a threaded portion with a distal male "stud" arrangement. Moreover, the wheel, bearing, and support axes coincide.

Once threaded into plate 703, the two assemblies 701 provide two contact points for the guide rail in an otherwise conventional manner, which points define a line. To account for small discrepancies in linearity, the third guide wheel assembly 702 is eccentric. As described above, the longitudinal axis of support is distinct from the wheel and longitudinal bearing axes. As described above with respect to FIG. 6, the eccentric assembly may be rotated in counter-bore 710 to close and eliminate any gap between the wheel and the rail. Once in position, nut 704 may be tightened to securely hold the desired orientation.

One will appreciate that many arrangements of mounting plates and guide wheel assemblies are possible in accord with the principals of the invention. Different embodiments may have any number of guide wheel assemblies and mounting accessories.

For example, there may be more than one rail in a guide wheel and rail system. FIG. 12 and FIG. 13 are, respectively, perspective and cut-away views of a dual rail guide wheel and mounting plate system. The cutting plane is indicated as 13-13 in FIG. 12. Wheel assemblies 801 and 802, as well as rail lubricators 806 are attached to mounting plate 803. The rails are not shown. Along each rail, there is an eccentric guide wheel assembly 802 and a non-eccentric assembly 801. Again, an eccentric assembly is an assembly with a longitudinal axis of support distinct from the wheel axis and longitudinal bearing axis. See FIG. 9 and FIG. 10 for an exemplary embodiment.

In FIG. 13, bolts 810 engage female, threaded portions 820 of monolithic journal bodies 830, thereby fastening guide wheel assemblies 801 and 802 to mounting plate 803. Along the direction of each rail, there is an eccentric guide wheel assembly 802. As described in detail above, by rotating the bearing axis relative to the mounting plate, small positioning discrepancies can be accounted for and direct contact of the rail and wheels can be maintained. In this embodiment, for example, such discrepancies may be due to the rails or to machining tolerances in locating holes for bolts 810. Once one reaches a desired positioning of the wheel assembly, bolt 801 may be tightened from above, just as with nut 704 in FIG. 11 where the monolithic journal had a male threaded portion.

Advantageously, the configuration of the present invention requires less parts than prior guide wheel assemblies. As such, a supplier or a consumer has fewer parts to order, buy or stock. More importantly, the integrated stud/race and bushing/race configurations of the present invention allows the use of larger diameter hardware to secure the guide wheel to its respective mount. A larger diameter fastener has less deflection, can handle higher stress loads, and can be pre-loaded to higher levels.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A guide wheel assembly, consisting of:
    a monolithic journal body adapted to provide both radial and axial constraint to a plurality of guide wheel bearing balls, said monolithic journal body having an inner bearing race, an axial mounting face, a longitudinally extending threaded mounting portion, and a hexagonal tool engaging surface located between said axial mounting face and said inner bearing race, said monolithic journal body defining a support axis and a bearing axis, and
    a guide wheel having an outer bearing race and rotatably support by said journal body for rotation about said inner bearing race, and a plurality of bearing balls located between the inner and outer bearing races.

2. A guide wheel assembly according to claim 1, wherein said support axis and said bearing axis are distinct such that said threaded mounting portion is eccentrically disposed on said journal body.

3. A guide wheel assembly according to claim 1, wherein said threaded mounting portion is a through-bore extending longitudinally through said journal body wherein said journal body serves as a bushing.

4. A guide wheel assembly according to claim 1, wherein said threaded mounting portion is a longitudinally extending stud having a threaded end.

5. A guide wheel assembly according to claim 4, wherein said threaded mounting portion includes a collar shoulder disposed between said threaded end and said a hexagonal tool engaging portion, said collar shoulder including said axial mounting face and an outer mounting diameter wherein said axial mounting face and said outer mounting diameter are dimensioned and configured to cooperate with a counter bore of a mounting plate.

6. The guide wheel assembly of claim 1, wherein the monolithic journal body is made of hardened steel.

7. A guide wheel assembly, consisting of:
    a wheel having a wheel bore therethrough, the wheel bore centered on a wheel axis, wherein a wheel bore surface is formed and dimensioned to be an outer bearing race of the guide wheel assembly;
    a monolithic journal body adapted to provide both radial and axial constraint to a plurality of guide wheel bearing balls, said monolithic journal body having a longitudinal bearing axis and a longitudinal axis of support, said monolithic journal body including,
    a first portion formed and dimensioned to be an inner bearing race of the guide wheel assembly, the first portion symmetrically disposed about the longitudinal bearing axis of the journal body, and
    a threaded portion disposed about the longitudinal axis of support, the longitudinal axis of support being distinct from the longitudinal bearing axis of the journal body; and
    at least one bearing located between the inner and outer bearing races such that the longitudinal bearing axis of the journal body coincides with the wheel axis, thereby enabling rotation of the wheel relative to the journal body about the coinciding axes.

8. The guide wheel assembly of claim 7, wherein the threaded portion of the monolithic journal body is female.

9. The guide wheel assembly of claim 7, wherein the threaded portion of the monolithic journal body is male.

10. The guide wheel assembly of claim 7, wherein the threaded portion of the monolithic journal body is male, and the journal body further includes a collar shoulder located between the threaded portion and the bearing race portion of the journal body, the collar shoulder circumferentially extending about the axis of support at a distance greater than the threaded portion, for cooperating with a counter bore of a mounting structure to effect alignment of the axis of support and the mounting structure as location the bearing axis relative to the mounting structure is adjusted.

11. The guide wheel assembly, of claim 7, wherein the wheel bore surface and the first portion of the monolithic journal body include furrows for cooperating with the at least one bearing to restrain translation of the journal body relative to the wheel along the bearing axis.

12. The guide wheel assembly of claim 7, wherein the journal body further includes a mounting face and a tool-engaging surface located between the mounting face and the first, inner bearing race portion of the journal body.

13. The guide wheel assembly of claim 7, wherein the monolithic journal body is steel.

14. A guide wheel assembly, consisting of:
    a monolithic wheel having a wheel bore therethrough, the wheel bore centered on a wheel axis, wherein a wheel bore surface includes furrows, the furrows formed and dimensioned to be an outer bearing race of the guide wheel assembly;
    a monolithic journal body adapted to provide both radial and axial constraint to a plurality of guide wheel bearing balls, said monolithic journal body having a longitudinal bearing axis and a longitudinal axis of support, said monolithic journal body including,
    a first portion formed and dimensioned to be an inner bearing race of the guide wheel assembly, the first portion including furrows and symmetrically disposed about the longitudinal bearing axis of the journal body, and
    a second, threaded portion disposed about the longitudinal axis of support; and
    a plurality of bearings located between the inner and outer bearing races such that the longitudinal bearing axis of the journal body coincides with the wheel axis, the bearings confined by the furrows, thereby enabling rotation of the wheel relative to the journal body about the coinciding axes and restraining translation of the journal body relative to the wheel along the coinciding axes.

15. The guide wheel assembly of claim 14, wherein the threaded portion of the monolithic journal body is female.

16. The guide wheel assembly of claim 14, wherein the threaded portion of the monolithic journal body is male.

17. The guide wheel assembly of claim 14, wherein the longitudinal axis of support is distinct from the longitudinal bearing axis of the journal body.

18. The guide wheel assembly of claim 17, wherein the threaded portion of the monolithic journal body is male, and the journal body further includes a collar shoulder located between the threaded portion and the bearing race portion of the journal body, the collar shoulder circumferentially extending about the axis of support at a distance greater than the threaded portion, for cooperating with a counter bore of a mounting structure to effect alignment of the axis of support and the mounting structure as location the bearing axis relative to the mounting structure is adjusted.

19. The guide wheel assembly of claim 14, wherein the journal body further includes a mounting face and a tool-engaging surface located between the mounting face and the first, inner bearing race portion of the journal body.

20. The guide wheel assembly of claim 14, wherein the monolithic journal body further includes two tool engaging surfaces located on opposing sides of the first, inner bearing race portion of the journal body, the tool engaging surfaces symmetrically disposed about the longitudinal bearing axis of the journal body and the longitudinal axis of support, respectively.

* * * * *